United States Patent Office 3,066,113
Patented Nov. 27, 1962

3,066,113
DYE RECEPTIVE BLEND OF A SYNTHETIC HYDROPHOBIC FIBER-FORMING POLYMER AND A LINEAR POLYACRYLIC ANHYDRIDE AND METHOD OF PREPARING SAME
Lawrence F. Arnold, Avon Lake, Ohio, assignor to The B. F. Goodrich Company, New York, N.Y., a corporation of New York
No Drawing. Filed Aug. 1, 1958, Ser. No. 752,427
14 Claims. (Cl. 260—45.4)

This invention relates to dye receptive synthetic polymer blends and more particularly pertains to dye receptive polyblends of hydrophobic film and fiber forming synthetic polymers with hydrophilic linear polyacrylic anhydride and with tertiary amino ester derivatives of linear polyacrylic anhydride.

Many of the present day synthetic hydrophobic polymers most useful in the form of films, coatings and particularly fibers, have a common disadvantage, namely, the lack of ability to absorb and retain the common acid, basic and acetate type dyes. Many devices have been used by numerous workers in the field to overcome the aforementioned lack of dyeability. Polyblends of synthetic fiber-forming polymers with basic polymers such as polyvinyl pyridine have been proposed for increasing the acid dyeability of the resulting fiber. Acidic polymers have been used in synthetic fiber polyblends to impart basic dyeability, basic polymers have been used to improve acid dyeability and hydrophilic polymers have been used to impart acetate dyeability. The polyblends of the aforementioned types have been specific for specific types of dyes which means that much larger inventories of staple are required than would be necessary in the case of a single synthetic polyblend which is capable of picking up all three types of dyes.

Accordingly, it is an object of this invention to provide blends of hydrophobic synthetic fiber-forming polymers which are capable of picking up and retaining acidic, basic and acetate dyes. Another object is the provision of a method for preparing these dyeable synthetic film and fiber-forming polyblends. Still further objects and advantages of the present invention will appear from the detailed description set forth below, it being understood that such detailed description is given by way of illustration and explanation only, and not by way of limitation, since various changes therein may be made by those skilled in the art without departing from the scope and spirit of the present invention.

I have discovered an unusually highly dye receptive composition comprising a polyblend of from about 70 to about 95% by weight of a synthetic hydrophobic fiber-forming polymer with from about 5 to about 30% by weight of a hydrophilic polymer represented by linear polymeric acrylic anhydride and a partial tertiary amino ester of linear polyacrylic anhydride.

The synthetic hydrophobic fiber-forming polymers embodied in this invention include the copolymers of vinylidene cyanide with vinyl esters such as vinyl acetate, vinyl propionate, vinyl butyrate and the like and others more fully described and claimed in U.S. Patent 2,615,866; the the polyalkylene terephthalates which result from the esterification-condensation of a terephthalate ester or terephthalic acid with an alkylene glycol such as polyethylene terephthalate, polypropylene terephthalate and the like; the more amorphous mixed polyesters such as polyethylene terephthalate-isophthalate; the polymeric amides which result from the condensation of a dibasic aliphatic acid and an aliphatic diamine or the condensation-polymerization of lactams such as the nylons; and polymers and copolymers of acrylonitrile such as polyacrylonitrile and acrylonitrile-vinyl acetate copolymers.

The linear polyacrylic anhydride embodied in the present invention and methods for preparation thereof are more fully described and claimed in the copending application Serial No. 555,308, filed December 27, 1955 by John F. Jones. The partial tertiary amino esters of linear polyacrylic anhydride embodied in this invention are of the type described and claimed in the copending application Serial No. 724,889, filed March 31, 1958, by John F. Jones, Harold Tucker and Lawrence F. Arnold now U.S. Patent 3,005,785. In the latter patent it is disclosed that from about 20 to 100 mol percent of the anhydride groups are reacted with an alcohol, including tertiary amino alcohols defined herein, for the purpose of preparing partial esters in which not more than one acyloxy group of the anhydride is esterified.

The partial tertiary amino esters of linear polyacrylic anhydride useful in the present invention include those which result from the treatment of linear polyacrylic anhydride, with up to one mole per mole of anhydride groups present in the polymer of an alcohol conforming to the structure

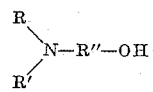

wherein R and R' represent alkyl groups having from 1 to 4 carbon atoms and R'' represents an alkylene group having from 1 to 4 carbon atoms such as methylene, ethylene, propylene and butylene. The amino alcohols useful for preparing the partial tertiary amino esters of linear polyacrylic anhydride embodied in this invention include N,N - dimethylaminoethanol, N,N - diethylaminoethanol, N,N - di - n - propylaminoethanol, N,N - di - isopropylaminoethanol, N,N-di-n-butylaminoethanol, N,N-di-isobutylaminoethanol, N,N-di-sec-butylaminoethanol, N-methyl-N-ethylaminoethanol, N-methyl-N-propylaminoethanol, N,N-di-methylamino-n-propanol, N,N-diethylamino-iso-propanol, N,N-dimethyl-amino-n-butanols and the like and others.

In the practice of the present invention the linear polyacrylic anhydride and the partial tertiary amino esters of polyacrylic anhydride are incorporated into the hydrophobic fiber-forming polymer by physical blending of the finely divided polymer particles followed by fusion of the mixture, by mixing the polymers in a mutual solvent or by coating the hydrophobic fiber-forming polymer with a solution of the linear polyacrylic anhydride or partial tertiary amino ester of linear polyacrylic anhydride. The hydrophobic fiber-forming polymer may also be coated or milled with the fused linear polyacrylic anhydride or partial tertiary amino ester of linear polyacrylic anhydride to produce the compositions embodied in this invention.

In the following illustrative examples the quantities of ingredients are given in parts by weight unless otherwise indicated.

*Example I*

To a mixture of about 10% glacial acrylic acid and 90% benzene was added one mole of acetic anhydride for each mole of acrylic acid. Sufficient benzoyl peroxide was added to provide a concentration of 2% based on the acrylic acid. Air was swept out of the polymerization reactor with nitrogen, the reactor was sealed and the temperature was adjusted to 50° C. After about 16 hours the reaction was complete and the linear polyacrylic anhydride formed as a white, fluffy powder suspended in benzene. The polymer was filtered, washed with benzene and dried in a vacuum oven at 50° C.

A solution of 5 parts of linear polyacrylic anhydride prepared in the foregoing manner in 95 parts of dimethyl formamide was blended with a dimethyl formamide solution of a vinylidene cyanide-vinyl acetate copolymer composed of substantially equimolar quantities of vinylidene cyanide and vinyl acetate so that a final solution resulted which contained about 20% solids, said solids being a mixture of 25 parts of linear polyacrylic anhydride and 75 parts of the vinylidene cyanide-vinyl acetate copolymer. The poly-blend solution was passed through a spinnerette into a water bath and the resulting fiber was air dried. A dried fiber exhausted the dye bath containing Basic Victoria Blue dye and another dried fiber exhausted the dye bath containing the copper ion dye Wool Fast Blue BLA. Both of the dyed samples showed that complete dyeing had occurred throughout upon examination of cross-sections of the dyed fibers under a light microscope. The softening points and tensile strengths of the dyed fibers were the same as those of the pure vinylidene cyanide-vinyl acetate copolymer fiber spun in the above-described manner.

*Example II*

In a manner similar to that described in Example I a 20% dimethyl formamide solution of a mixture of 10 parts of linear polyacrylic anhydride and 90 parts of polyacrylonitrile was prepared along with a 20% dimethyl formamide soluiton of polyacrylonitrile as a control. Films were cast from each of these two solutions and the acid and basic dyeability of the dry films were tested with the following observed results:

| Polymer Comp. | Dye Bath | |
|---|---|---|
| | Pontacyl Violet 6R | Basic Victoria Blue |
| Polyacrylonitrile | No dye pickup. | Fair dyeing. |
| 90% polyacrylonitrile—10% linear polyacrylic anhydride. | Light dyeing. | Heavy dyeing. |

*Example III*

A mixture of 26 parts of N,N-diethylaminoethanol and 74 parts of linear polyacrylic anhydride in dimethyl formamide was stirred at room temperature for 16 hours. The resulting solution was blended with a dimethyl formamide solution of a vinylidene cyanide-vinyl acetate copolymer to produce a 20% solids mixture containing 10 parts of the partial diethylaminoethyl ester of linear polyacrylic anhydride and 90 parts of the vinylidene cyanide-vinyl acetate copolymer. The polyblend solution was spun into an excess of methanol and the resulting dried fiber was receptive to the acid dye Pontacyl Violet 6R, the acetate dye Artisil Direct Red 3BP and the basic dye Basic Victoria Blue. Microscopic examination of cross-sections of the dyed films showed that 100% penetration had occurred in the case of the acid and acetate dyes and from 60–100% penetration had occurred in the case of the basic dye. A vinylidene cyanide-vinyl acetate fiber showed only slight penetration of the acetate dye and no penetration of the acid and basic dyes when subjected to dyeing in the above-described manner.

*Example IV*

A physical mixture of 90 parts of a nylon powder and 10 parts of linear polyacrylic anhydride was molded in a closed mold at about 490° F. The resulting sheet was decidedly more receptive to dyeing with acetate, acid and basic dyes of the types mentioned in the previous examples than a nylon control. The partial N,N-dimethylaminoethyl ester of linear polyacrylic anhydride behaved in a manner similar to the linear polyacrylic anhydride when blended with nylon in the above-described manner with the exception that the partial ester imparted greater acid dye receptivity to the molded product.

*Example V*

A physical mixture of 90 parts of a polyethylene terephthalate and 10 parts of linear polyacrylic anhydride was molded in a closed mold at 490° F. The product retained acid, basic and acetate dyes when passed through the dye baths in a markedly superior manner than did a molded polyethylene terephthalate control. When the partial N,N-dimethylaminopropanol ester of linear polyacrylic anhydride was substituted for the linear polyacrylic anhydride in this example similar dye pickup was observed except that the pickup of the acid dye was better.

The embodiments of the invention in which an exclusive property or privilege is claimed are defined as follows:

1. The dye receptive composition comprising a polyblend of from about 70 to 95% by weight of a synthetic hydrophobic fiber-forming polymer selected from the group consisting of a copolymer of vinylidene cyanide and a vinyl ester, a polyalkylene terephthalate, a mixed polyalkylene terephthalate-isophthalate, a polymeric amide resulting from the condensation of a dibasic aliphatic acid and an aliphatic diamine, a polymeric amide resulting from the condensation-polymerization of a lactam, polyacrylonitrile and a copolymer of acrylonitrile and vinyl acetate with from about 5 to 30% by weight of a hydrophilic polymer selected from the group consisting of linear polyacrylic anhydride and the partial tertiary amino alkyl ester of linear polyacrylic anhydride resulting from the partial esterification of linear polyacrylic anhydride with from 20 to 100 mol percent based on the anhydride groups of an alcohol conforming to the structure

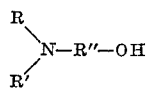

wherein R and R' represent alkyl groups having from 1 to 4 carbon atoms and R" represents an alkylene group having from 1 to 4 carbon atoms.

2. The composition of claim 1 wherein the hydrophobic fiber-forming polymer is a vinylidene cyanide-vinyl ester interpolymer.

3. The composition of claim 1 wherein the hydrophobic fiber-forming polymer is polyacrylontrile.

4. The composition of claim 1 wherein the hydrophobic fiber-forming polymer is a polyalkylene terephthalate.

5. The composition of claim 1 wherein the hydrophobic fiber-forming polymer is a polyamide resulting from the condensation of a dibasic aliphatic acid and an aliphatic diamine.

6. The composition of claim 1 wherein the hydrophilic polymer is linear polyacrylic anhydride.

7. The composition of claim 1 wherein the hydrophilic polymer is the partial tertiary amino alkyl ester of linear polyacrylic anhydride resulting from the partial esterification of linear polyacrylic anhydride with from 20 to 100 mol percent based on the anhydride groups of an alcohol conforming to the structure

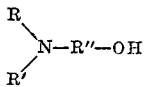

wherein R and R' represent alkyl groups having from 1 to 4 carbon atoms and R" represents an alkylene group having from 1 to 4 carbon atoms.

8. The dye receptive composition comprising a polyblend of from about 70 to about 95% by weight of an equimolar interpolymer of vinylidene cyanide and vinyl acetate with from about 5 to about 30% by weight of linear polyacrylic anhydride.

9. The dye receptive composition comprising a polyblend of from about 70 to about 95% by weight of an equimolar interpolymer of vinylidene cyanide and vinyl acetate with from about 5 to about 30% by weight of the partial N,N-diethylaminoethyl ester of linear polyacrylic anhydride resulting from the esterification of said polyacrylic anhydride with from 20 to 100 mol percent based on the anhydride groups of N,N-diethylamino ethanol.

10. The dye receptive composition comprising a polyblend of from about 70 to about 95% by weight of polyacrylonitrile with from about 5 to about 30% by weight of a linear polyacrylic anhydride.

11. The dye receptive composition comprising a polyblend of from about 70 to about 95% by weight of nylon with from about 5 to about 30% by weight of the partial N,N-dimethylaminoethyl ester of linear polyacrylic anhydride resulting from the esterification of said polyacrylic anhydride with from 20 to 100 mol percent based on the anhydride groups of N,N-dimethylamino ethanol.

12. The dye receptive composition comprising a polyblend of from about 70 to about 95% polyethylene terephthalate with from about 5 to about 30% by weight of the partial N,N-dimethylaminopropyl ester of linear polyacrylic anhydride resulting from the esterification of said polyacrylic anhydride with from 20 to 100 mol percent based on the anhydride groups of N,N-dimethylamino propanol.

13. The method for preparing a dye receptive polyblend of from about 70 to 95% by weight of a synthetic hydrophobic fiber-forming polymer selected from the group consisting of a copolymer of vinylidene cyanide and a vinyl ester, a polyalkylene terephthalate, a mixed polyalkylene terephthalate-isophthalate, a polymeric amide resulting from the condensation of a dibasic aliphatic acid and an aliphatic diamine, a polymeric amide resulting from the condensation-polymerization of a lactam, polyacrylonitrile and a copolymer of acrylonitrile and vinyl acetate with from about 5 to about 30% by weight of a hydrophilic polymer selected from the group consisting of linear polyacrylic anhydride and the partial tertiary amino alkyl ester of linear polyacrylic anhydride resulting from the partial esterification of linear polyacrylic anhydride with from 20 to 100 mol percent based on the anhydride groups of an alcohol conforming to the structure

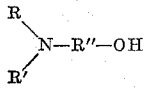

wherein R and R′ represent alkyl groups having from 1 to 4 carbon atoms said method comprising intimately mixing the powdered polymers and fusing the mixture at a temperature of about 490° F.

14. The method of preparing a polyblend of (1) from about 70 to about 95% by weight of synthetic hydrophobic fiber forming polymer selected from the group consisting of a copolymer of vinylidene cyanide and vinyl ester, a polyalkylene terephthalate, a mixed polyalkylene terephthalate-isophthalate, a polymeric amide resulting from the condensation of dibasic aliphatic acid and an aliphatic diamine, a polymeric amide resulting from the condensation-polymerization of a lactam, polyacrylontrile and a copolymer of acrylonitrile and vinyl acetate with (2) from about 5 to about 30% by weight of a hydrophilic polymer selected from the group consisting of linear polyacrylic anhydride and a partial ester of the said linear anhydride resulting from the partial esterification of said polyacrylic anhydride with from about 20 to 100 mol percent based on the anhydride groups of an alcohol conforming to the structure

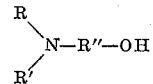

wherein R and R′ represent alkyl groups having from 1 to 4 carbon atoms and R″ represents an alkylene group having from 1 to 4 carbon atoms, said method comprising dissolving the polymer in a mutual solvent and thereafter removing the said solvent from the mixture.

References Cited in the file of this patent

UNITED STATES PATENTS

| | | |
|---|---|---|
| 2,313,565 | McDowell | Mar. 9, 1943 |
| 2,569,470 | Hagemeyer et al. | Oct. 2, 1951 |
| 2,615,866 | Gilbert | Oct. 28, 1952 |
| 2,682,519 | Caldwell | June 29, 1954 |
| 2,688,008 | Chaney et al. | Aug. 31, 1954 |
| 2,756,218 | Ham | July 24, 1956 |
| 2,955,324 | Morgan | Oct. 11, 1960 |
| 3,005,785 | Jones et al. | Oct. 24, 1961 |

FOREIGN PATENTS

| | | |
|---|---|---|
| 450,455 | Great Britain | July 15, 1936 |